United States Patent Office 3,049,501
Patented Aug. 14, 1962

3,049,501
INCREASING THE PARTICLE SIZE OF SYNTHETIC RUBBER LATEX BY LOWERING AND RAISING THE pH IN THE PRESENCE OF POLYVINYL-METHYL ETHER
Louis H. Howland, Watertown, and Victor S. Chambers, Naugatuck, Conn., assignors to United States Rubber Company, New York, N.Y., a corporation of New Jersey
No Drawing. Filed Jan. 28, 1960, Ser. No. 5,098
16 Claims. (Cl. 260—17.4)

This invention relates to increasing the particle size of synthetic rubber latices, and particularly to permit them to be concentrated to fluid latices of high solids content.

It is known to reduce the pH of synthetic rubber latices containing soap emulsifiers whereby the soap partially reacts with the acidic material used to reduce the pH to produce free soap-forming acid, thereby destabilizing the system and causing agglomeration of the dispersed rubber particles into particles of larger size. The pH of the latex may be raised after such increase in particle size to improve the stability of the latex, and such restabilized latex of larger particle size may be concentrated to fluid latices of high solids content.

We have found that the increase in particle size of a synthetic rubber latex containing soap on reduction of the pH of the latex is much greater if the pH is reduced in the presence of polyvinyl methyl ether. Such latices on restabilization by raising the pH may readily be concentrated, preferably by evaporation concentration, to fluid high solids latices.

In carrying out the present invention, there is added to a synthetic rubber latex containing 2 to 10 parts of soap per 100 parts of latex solids and having a pH from 8 to 11 a small amount of polyvinyl methyl ether, viz. 0.001% to 1% based on the weight of the latex solids. The pH of the latex is then reduced to within the range of 5.5 to 7.5 as by incorporating acidic material in the latex, i.e. material that produces hydrogen ions in aqueous medium, e.g. an acid such as carbon dioxide or formic acid or acetic acid, or a salt that hydrolyzes to form acid such as sodium silicofluoride, or an ammonium salt of a strong acid, such as ammonium chloride, and formaldehyde which reacts with the ammonia to form hexamethylenetetramine and liberates free hydrochloric acid. The pH of the latex is then increased to a pH of 8 to 11 as by the addition of ammonia or sodium or potassium hydroxide. The latex may be permitted to rest at room or elevated temperature after destabilization on lowering the pH and before raising the pH. The latex will conventionally have a solids content of 20% to 50%, and after the pH of the latex has been lowered to within the range of 5.5 to 7.5 in the presence of the polyvinyl methyl ether and then raised to 8 to 11, the latex may be concentrated to a solids content of 55% to 70% giving a fluid high solids latex. The latex may be concentrated by increasing the solids content in known manner as by creaming with a vegetable mucilage, such as ammonium alginate. It is preferred, however, to increase the solids content by evaporation concentration. The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention. The soaps in the latex from the polymerization, as is known, will be water-soluble soaps of soap-forming monocarboxylic acids, such as alkali-metal, ammonium and amine salts of higher fatty acids having 10 to 24 carbon atoms in the molecule or of rosin acids, including dehydrogenated, hydrogenated and disproportionated rosin acids. The latex, in addition to the necessary 2 to 10 parts of soap per 100 parts of latex solids, may also contain other types of surface-active dispersing agents such as sulfonated or sulfated compounds having the general formula

R—SO$_3$M or R—OSO$_3$M, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Such sulfonated and sulfated dispersing agents may be added to the latex before reducing the pH according to the present invention to assure stability to the latex during particle size enlargement and on concentrating the latex.

Polyvinyl methyl ethers are generally graded by specific viscosity which is a measure of average molecular weight. Polyvinyl methyl ethers having a specific viscosity from 0.015 to 1.1, which corresponds to average molecular weights in the range from 160 to 6000, may be used in the present invention. The preferred polyvinyl methyl ethers are those having specific viscosities between 0.1 and 1.1, which corresponds to molecular weights in the range from 4000 to 6000. While the amounts of polyvinyl methyl ether may be from 0.001 to 1 part per 100 parts of latex solids, the preferred range is 0.01 to 0.5 part per 100 parts of latex solids.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a CH$_2$=C< group where at least one of the disconnected valences is attached to an electro-negative group, that is, a group which substantially increases the electrical dissymmetry or polar character of the molecule. Examples of compounds which contain a CH$_2$=< group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex."

The following examples illustrate the invention. All parts and percentages referred to herein are by weight.

*Example 1*

To 777 gm. samples A and B of a latex of a synthetic rubber copolymer of 50 parts of butadiene-1,3 and 50 parts of styrene of 38.6% solids concentration containing 4.5 parts of potassium oleate soap and 2.1 parts of potassium disproportionated rosin soap emulsifying agent and 0.1 part of a dispersing agent which was the condensation product of sodium naphthalene sulfonate and formaldehyde per 100 parts of latex solids and having a pH of 10.2 and an average particle diameter of 600 Angstrom units were added 2 parts per 100 parts of latex solids of a condensation product of sodium naphthalene sulfonate and formaldehyde dispersing agent as a 20% aqueous solution. Sample A was not otherwise compounded. To sample B was added 0.1 part per 100 parts of latex solids of polyvinyl methyl ether (specific viscosity about 0.4) as a 5% aqueous solution. Carbon dioxide was bubbled through latex samples A and B at room temperature until the pH was lowered to 6.5 and 6.7, respectively. The latex samples were held at this pH of 6.5 and 6.7 for about 10 minutes, and then restabilized by raising the pH to 9.1 and 9.5, respectively, with 10% aqueous ammonia. The average particle diameter of samples A and B after lowering the pH and raising it again was 640 and 1020 Angstrom units, respectively, showing the great increase in particle size enlargement in the presence of the polyvinyl methyl ether. Samples A and B after lowering the pH and raising it again were concentrated by evaporation concentration in a laboratory disc concentrator at 35° C. to 40° C. Sample A was concentrated to 56% solids content with a viscosity of 4900 centipoises. Sample B was concentrated to a solids content of 68% with a viscosity of 900 centipoises. The viscosity measurements in this and the following examples were made at approximately 25° C.

*Example 2*

To 852 gm. of a latex of a synthetic rubber copolymer of 70 parts of butadiene-1,3 and 30 parts of styrene of 35.2% solids concentration containing 3.7 parts of potassium oleate soap emulsifying agent and 0.1 part of a dispersing agent which was the condensation product of sodium naphthalene sulfonate and formaldehyde per 100 parts of latex solids and having a pH of 8.7 and an average particle diameter of 720 Angstrom units was added 2 parts per 100 parts of latex solids of a condensation product of sodium naphthalene sulfonate and formaldehyde dispersing agent as a 20% aqueous solution, and 0.2 part per 100 parts of latex solids of polyvinyl methyl ether (specific viscosity about 0.6) as a 5% aqueous solution. Carbon dioxide was bubbled through the latex at room temperature until the pH was below 7.0 for about 10 minutes. The final pH was 6.3. The pH of the latex was then raised to 8.6 with 10% aqueous ammonia. The average particle diameter had increased to 1070 Angstrom units. The latex was concentrated by evaporation concentration in a laboratory disc concentrator at 35° C. to 40° C. to 65% solids content. The concentrated latex had an average particle diameter of 2160 Angstrom units and a viscosity of 150 centipoises.

*Example 3*

Another 852 gm. portion of the latex used in Example 2 was heated to 60° C. in a water bath and to this was added 1 part per 100 parts of latex solids of a condensation product of sodium naphthalene sulfonate and formaldehyde dispersing agent as a 20% aqueous solution 0.2 part per 100 parts of latex solids of the polyvinyl methyl ether used in Example 2 as a 5% aqueous solution. Carbon dioxide was bubbled through the heated latex for 15 minutes. After cooling the latex to near room temperature, its pH was 6.8. The pH of the latex was raised to 9.6 with 10% aqueous ammonia. The average particle diameter of the latex was 1100 Angstrom units. The latex was concentrated by evaporation concentration in a laboratory disc concentrator at 35° C. to 40° C. to 60% solids content. The concentrated latex had an average particle diameter of 2100 Angstrom units and a viscosity of 165 centipoises.

*Example 4*

To 1010 gm. samples A and B of a latex of a synthetic rubber copolymer of 70 parts of butadiene-1,3 and 30 parts of styrene and 29.7% solids concentration containing 5.0 parts of potassium oleate soap emulsifying agent and 0.6 part of a dispersing agent which was the condensation product of sodium naphthalene sulfonate and formaldehyde per 100 parts of latex solids and having a pH of 10 and an average particle diameter of 810 Angstrom units were added 2 parts per 100 parts of latex solids of a commercial dispersing agent which was the condensation product of sodium naphthalene sulfonate and formaldehyde as a 20% solution. Sample A was not otherwise compounded. To sample B was added 0.1 part per 100 parts of latex solids of polyvinyl methyl ether (specific viscosity about 0.95) as a 5% aqueous solution. Carbon dioxide was bubbled through latex samples A and B at room temperature until the pH was below 7.0 for about 10 minutes. The final pH of samples A and B was 6.4 and 5.9, respectively. Samples A and B were then restabilized by raising the pH of the latices to 9.1 and 9.2, respectively, with 10% aqueous ammonia. The average particle diameter of samples A and B after lowering the pH and raising it again was 980 and 1880 Angstrom units, respectively. The latices were concentrated in a laboratory disc concentrator at 35° C. to 40° C. Sample A was concentrated to 59% solids content with a viscosity of 11,200 centipoises. Sample B was concentrated to a 70% solids content with a viscosity of 680 centipoises.

*Example 5*

The latex used in this example was prepared by polymerizing for seven hours at 41° F. to 80% conversion a recipe consisting of 150 parts of water, 70 parts of butadiene-1,3, 30 parts of styrene, 3.25 parts of potassium oleate, 1.75 parts of potassium disproportionated rosin soap, 0.5 part of the condensation product of sodium naphthalene sulfonate and formaldehyde, 0.2 part of diisopropyl benzene hydroperoxide, 0.1 part of ferrous sulfate heptahydrate, 0.08 part of ethylene diamine tetraacetic acid, 0.03 part of sodium dithionite, and 0.1 part of tertiary dodecyl mercaptan. After polymerization residual butadiene was vented off and residual styrene was removed by steam distillation. The solids content of the latex was 31.4%, the pH was 9.5, and the average particle diameter was 640 Angstrom units.

To three 960 gm. samples A, B and C of the latex were added zero, 0.25 and 1.0 part, respectively, per 100 parts of the latex solids, of a polyvinyl methyl ether as a 1% aqueous solution. The polyvinyl methyl ether had a specific viscosity of about 0.4. The latices were concentrated in a laboratory disc concentrator at 35° C. to 50° C. to as high solids content as possible. The amounts of polyvinyl methyl ether added to samples A, B and C (as parts per 100 parts of latex solids), and the average particle diameter and solids content and viscosity and surface tension of the concentrates are shown in the following table:

| Sample | Added PVM | Average Particle Diameter (Angstrom Units) | Solids Content (Percent) | Viscosity (Centipoises) | Surface Tension (Dynes per cm.) |
|---|---|---|---|---|---|
| A | None | 660 | 43.6 | 8,070 | 62.9 |
| B | 0.25 | 640 | 44.4 | 10,000 | 63.1 |
| C | 1.0 | 690 | 46.2 | 10,000 | 63.0 |

Comparison of samples B and C with sample A shows that the polyvinyl methyl ether of itself does not increase the particle size of the latex. The greater increase in the particle size of the latex on lowering pH of the latex and raising it in the presence of the polyvinyl methyl ether over the increase in particle size of the latex on lowering the pH and raising it in the absence of the polyvinyl methyl ether, as shown in Examples 1 to 3, is clearly a synergistic effect.

The latices of increased particle size according to the present invention, particularly of high solids content, may be used in the usual applications of latices, as in foam sponge manufacture, tire cord dipping, bonding and impregnating various materials, preparation of adhesives, and the like.

This application is a continuation-in-part of our application Serial No. 776,764, filed November 28, 1958.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises reducing the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises incorporating in in the latex material that produces hydrogen ions in aqueous medium, said material being in amount to reduce the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter increasing the pH of the latex to within the range of 8 to 11.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter adding ammonia to the latex in amount to increase the pH of the latex to within the range of 8 to 11.

4. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.05% to 0.5% of polyvinyl methyl ether based on the weight of the latex solids, said polyvinyl methyl ether having a specific viscosity from 0.015 to 1.1, and thereafter increasing the pH of the latex to within the range of 8 to 11.

5. The method of increasing the size of the dispersed polymer particles in a synthetic rubber latex of a copolymer of a mixture of butadiene-1,3 and up to 70% of said mixture of styrene containing 2 to 10 parts of a water-soluble soap of soap-forming monocarboxylic acid per 100 parts of latex solids and having a pH from 8 to 11 which comprises reducing the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11.

6. The method of increasing the size of the dispersed polymer particles in a synthetic rubber latex of a copolymer of a mixture of butadiene-1,3 and up to 70% of said mixture of styrene containing 2 to 10 parts of a water-soluble soap of soap-forming monocarboxylic acid per 100 parts of latex solids and having a pH from 8 to 11 which comprises incorporating in the latex material that produces hydrogen ions in aqueous medium, said material being in amount to reduce the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter increasing the pH of the latex to within the range of 8 to 11.

7. The method of increasing the size of the dispersed polymer particles in a synthetic rubber latex of a copolymer of a mixture of butadiene-1,3 and up to 70% of said mixture of styrene containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter adding ammonia to the latex in amount to increase the pH of the latex to within the range of 8 to 11.

8. The method of increasing the size of the dispersed polymer particles in a synthetic rubber latex of a copolymer of a mixture of butadiene-1,3 and up to 70% of said mixture of styrene containing 2 to 10 parts of a water-soluble soap of soap-forming monocarboxylic acid per 100 parts of latex solids and having a pH from 8 to 11 which comprises introducing carbon dioxide in the latex in amount to reduce the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11.

9. The method of concentrating a synethetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11, and then creaming the latex to a solids content of 55% to 70% with a vegetable mucilage creaming agent.

10. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter increasing the pH of the latex to within the range of 8 to 11, and then evaporating water from the latex until the latex is concentrated to a solids content of 55% to 70%.

11. The method of concentrating a synthetic rubber latex of a copolymer of a mixture of butadiene-1,3 and up to 70% of said mixture of styrene having a solids content of 20% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter increasing the pH of the latex to within the range of 8 to 11, and then creaming the latex to a solids content of 55% to 70% with a vegetable mucilage creaming agent.

12. The method of concentrating a synthetic rubber latex of a copolymer of a mixture of butadiene-1,3 and up to 70% of said mixture of styrene having a solids content of 20% to 50%, and containing 2 to 10 parts of a water-soluble soap of a soap-forming carboxylic acid per 100 parts of latex solids and having a pH from 8 to 11 which comprises reducing the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11, and then evaporating water from the latex until the latex is concentrated to a solids content of 55% to 70%.

13. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter adding ammonia to the latex in amount to increase the pH of the latex to within the range of 8 to 11, and then evaporating water from the latex until the latex is concentrated to a solids content of 55% to 70%.

14. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter increasing the pH of the latex to within the range of 8 to 11, and then creaming the latex to a solids content of 55% to 70% with a vegetable mucilage creaming agent.

15. The method of concentrating a synthetic rubber latex of a copolymer of a mixture of butadiene-1,3 and up to 70% of said mixture of styrene having a solids content of 20% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.001% to 1% of polyvinyl methyl ether based on the weight of the latex solids, said polyvinyl methyl ether having a specific viscosity from 0.015 to 1.1, and thereafter adding ammonia to the latex in amount to increase the pH of the latex to within the range of 8 to 11, and then evaporating water from the latex until the latex is concentrated to a solids content of 55% to 70%.

16. The method of concentrating a synthetic rubber latex of a copolymer of a mixture of butadiene-1,3 and up to 70% of said mixture of styrene having a solids content of 20% to 50%, and containing 2 to 10 parts of a water-soluble soap of a soap-forming carboxylic acid per 100 parts of latex solids and having a pH from 8 to 11 which comprises introducing carbon dioxide in the latex in amount to reduce the pH of the latex to within the range of 5.5 to 7.5 in the presence of 0.01% to 0.5% of polyvinyl methyl ether based on the weight of the latex solids, said polyvinyl methyl ether having a specific viscosity from 0.015 to 1.1, and thereafter increasing the pH of the latex to within the range of 8 to 11, and then creaming the latex to a solids content of 55% to 70% with a vegetable mucilage creaming agent.

References Cited in the file of this patent

UNITED STATES PATENTS

| | | |
|---|---|---|
| 2,138,073 | Schweitzer | Nov. 29, 1938 |
| 2,357,861 | Willson | Sept. 12, 1944 |
| 2,475,053 | Rumbold | July 5, 1949 |